US007271733B2

(12) United States Patent
Nicot et al.

(10) Patent No.: US 7,271,733 B2
(45) Date of Patent: Sep. 18, 2007

(54) SYSTEM AND METHOD FOR DETERMINING AT LEAST ONE PARAMETER OF AT LEAST ONE ROTATING MEMBER BY MEANS OF REFERENCE AND SPEED SIGNALS

(75) Inventors: Christophe Nicot, Quintal (FR); Christophe Duret, Quintal (FR)

(73) Assignee: S.N.R. Roulements, Annecy (FR)

( * ) Notice: Subject to any disclaimer, the term of this patent is extended or adjusted under 35 U.S.C. 154(b) by 309 days.

(21) Appl. No.: 10/988,570

(22) Filed: Nov. 16, 2004

(65) Prior Publication Data
US 2005/0110626 A1    May 26, 2005

(30) Foreign Application Priority Data
Nov. 21, 2003    (FR) .................................. 03 50879

(51) Int. Cl.
*G08B 5/36*        (2006.01)
*H04Q 5/22*        (2006.01)
*E01C 23/00*       (2006.01)

(52) U.S. Cl. ............................ 340/825.49; 340/10.1; 340/445; 73/146

(58) Field of Classification Search .......... 340/825.49, 340/10.1, 445; 73/146
See application file for complete search history.

(56) References Cited

U.S. PATENT DOCUMENTS 6,691,567 B2 * 2/2004 Walker et al. ................. 73/146
6,838,985 B2 * 1/2005 Ghabra et al. .............. 340/445
6,914,523 B2 * 7/2005 Munch et al. .............. 340/447

* cited by examiner

*Primary Examiner*—Jeffery Hofsass
*Assistant Examiner*—Scott Au
(74) *Attorney, Agent, or Firm*—Arent Fox LLP

(57) ABSTRACT

The invention concerns a system for determining at least one parameter of at least one member (1) rotating with respect to a fixed structure (2), comprising, for each rotating member (1), an assembly comprising a transponder (3), a code (5) comprising a reference singularity, a sensor (6) able to deliver a signal comprising a reference pulse corresponding to the detection of the reference singularity, a device (4) for detecting the parameter or parameters issuing from the transponder (3) and a device for measuring the speed of rotation of the rotating member (1);

the said system also comprising an activation device (7) which is connected to each sensor (6), to each detection device (4) and to each speed measurement device, the said activation device being able, when a reference pulse issuing from the sensor (6) of an assembly is recorded, to activate the detection device (4) of the assembly at a moment which is a function of the indexed position of the transponder (3) and of the measured speed, so that the transponder (3) of the assembly is in the transmission/reception cone of the communication means of the said detection device.

25 Claims, 1 Drawing Sheet

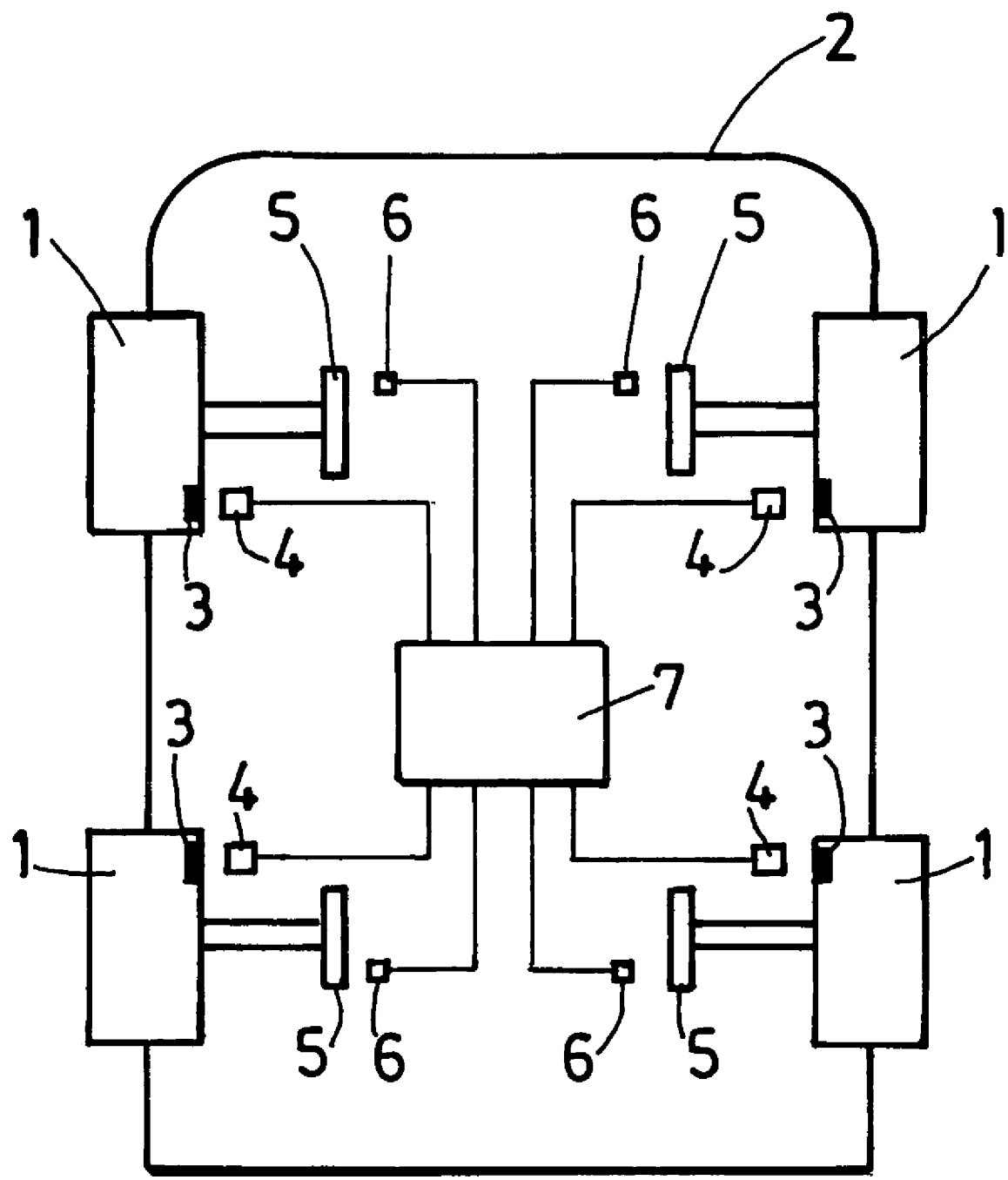

SYSTEM AND METHOD FOR DETERMINING AT LEAST ONE PARAMETER OF AT LEAST ONE ROTATING MEMBER BY MEANS OF REFERENCE AND SPEED SIGNALS

The invention concerns a system for determining at least one parameter of at least one member rotating with respect to a fixed structure, a method of determining at least one such parameter and a motor vehicle comprising such a system.

The invention applies typically to the determination of at least one parameter such as the pressure, temperature, deformation or wear of a motor vehicle tyre.

To do this, it is known how to use, for each tyre:
- a transponder which is rotationally fixed to the tyre, the said transponder being able to measure the parameter or parameters; and
- a device for detecting the parameter or parameters issuing from the transponder, the said device being fixed to the chassis of the vehicle and comprising an antenna able to transmit an excitation signal to the transponder and to receive the measurement or measurements.

To allow communication between the transponder and the detection device, the antenna on the latter is positioned close to the area of movement of the transponder, typically in the wheel arch.

Thus, by activating the detection device, it is possible to periodically obtain the value of the parameter or parameters measured by the transponder and to make this value available to a system, for example a safety system on the vehicle, which monitors and/or uses it.

One problem which is posed concerns the establishment of a procedure for activating the detection device which makes it possible to obtain satisfactory communication between the said device and the transponder. This is because, the antenna having a given transmission/reception cone, the activation must be effected when the transponder is situated in this cone.

According to a first solution, it has been proposed to activate the detection device continuously, but this presents several drawbacks. First of all, it gives rise to high electrical consumption, partly unnecessary when the transponder is not situated in the transmission/reception cone. In addition, it acts on the transponder at each rotation, which, under certain running conditions, is unnecessary and, in the case of an active transponder, consumes its battery power unnecessarily.

In order to attempt to limit the electrical consumption, it has been proposed, according to a second solution, to activate the detection device at a fixed frequency. However, this solution also presents several drawbacks. First of all, it does not make it possible to ensure that the transponder is in the transmission/reception cone when the detection device is activated. In particular, for a given activation frequency, there exist speeds of rotation of the transponder for which this condition is not fulfilled, which is incompatible with a use of the parameter or parameters in a safety function for the vehicle. In addition, this solution does not guarantee a determination of the parameter or parameters at a given frequency, for example according to the operating conditions of the vehicle.

In order to attempt to resolve the drawbacks of this second solution, it has been proposed to increase the size of the antenna so as to increase the corresponding transmission/reception cone. However, apart from the fact that this possibility can only limit these drawbacks without completely resolving them since a shadow area in the communication is always present, the increase in the size of the antenna causes increased integration constraints in the wheel arch as well as a higher power and therefore electrical consumption.

To resolve all these drawbacks, the invention proposes in particular a determination system which makes it possible to synchronise communication between the antenna and the transponder when the latter is in the transmission/reception cone, so as to make the communication secure whilst optimising electrical consumption, whilst being able to adapt the communication frequency to operating conditions of the vehicle.

To this end, and according to a first aspect, the invention proposes a system for determining at least one parameter of at least one member rotating with respect to a fixed structure, the said system comprising, for each rotating member, an assembly comprising:
- a transponder rotationally fixed to the rotating member, the said transponder being able to measure the parameter or parameters to be determined;
- a coder rotationally fixed to the rotating member, the said coder comprising a reference singularity whose angular position is indexed with respect to the angular position of the transponder on the rotating member;
- a sensor fixed to the fixed structure, the said sensor being disposed opposite to and at a reading distance from the coder, the said sensor being able to deliver a rotation pulse signal comprising a reference pulse corresponding to the detection of the reference singularity;
- a device for detecting the parameter or parameters issuing from the transponder, the said device being fixed to the fixed structure and comprising a communication means able to send an excitation signal to the transponder and to receive the measurement or measurements;
- a device for measuring the speed of rotation of the rotating member; the said system also comprising:

an activation device which is connected to each sensor, to each detection device and to each speed measurement device, the said activation device being able, when a reference pulse issuing from the sensor of an assembly is recorded, to activate the assembly detection device at a moment which is a function of the indexed position of the transponder and of the measured speed, so that the transponder of the assembly is in the transmission/reception cone of the communication means of the said detection device.

According to a second aspect, the invention proposes a method of determining at least one parameter of at least one member rotating with respect to a fixed structure by means of such a system, in which, when a reference pulse is recorded, the activation device determines an activation time according to the speed measured and the indexed position of the transponder, the said device activating the detection device after the elapse of this time.

According to a third aspect, the invention proposes a motor vehicle comprising such a system, each assembly being disposed so as to determine at least one parameter of a tyre of the said vehicle.

Other objects and advantages of the invention will emerge during the following description given with reference to the accompanying drawing, which schematically depicts a vehicle comprising a determination system according to the invention.

BRIEF DESCRIPTION OF DRAWINGS

FIG. 1 is a block diagram showing the embodiments of the invention.

The invention concerns a system for determining at least one parameter of at least one rotating member 1 in rotation with respect to a fixed structure 2. According to the embodiment described in relation to the figure, this system is intended for determining at least one parameter of at least one tyre 1 of a motor vehicle. In particular, the system allows the determination of the pressure, the temperature, the deformation and/or the wear of all the tyres 1 on the vehicle.

To do this, the system comprises, for each tyre 1, an assembly comprising a transponder 3 able to measure the parameter or parameters to be determined, and a device 4 for detecting the parameter or parameters issuing from the transponder 3. The transponder 3 is rotationally fixed to the tyre 1 and the detection device 4 is fixed, close to the transponder 3, to the chassis 2 of the vehicle. According to other applications, the transponder 3 can be fixed to the wheel or to the bearing on which the wheel is mounted.

The determination system makes it possible, by activating the detection device 4, to periodically obtain the value of the parameter or parameters measured by the transponder 3 and to make this value available to a system which is fixed with respect to the chassis 2, for example a vehicle safety system, which monitors and/or uses it. In particular, the automatic determination of the parameter or parameters can make it possible to warn the driver in the event of abnormality. In addition, the parameter or parameters can be used in driving aid systems such as wheel anti-locking (ABS), direction control (ESP) or electrical steering assistance (ESA), so as to adapt the action of these systems according to the value of the parameters determined.

An assembly consisting of transponder 3 and detection device 4 is known from the prior art:
- the detection device 4 comprising a communication means, for example in the form of a directional antenna, able to transmit an excitation signal, for example RF, to the transponder 3 and to receive the measurement or measurements; and
- the transponder 3 being able to be of the active type or of the passive type depending on whether it is supplied by its own battery in order to perform the measurement and communication or whether these functions are induced by the excitation signal issuing from the detection device 4. For determining the pressure of the tyre 1, the transponder 3 can be of the surface acoustic wave (SAW) type.

In the vehicle according to the invention, the antenna is housed in the wheel arch on which the tyre 1 is mounted and the transponder 3 is housed in the valve of the tyre 1. Thus the distance between antenna and transponder 3 is reduced, which makes it possible to optimise the electrical power necessary for the communication of the measurements between the tyre 1 and the chassis 2. In a variant, it is also possible to provide for the transponder 3 to be disposed in the tread of the tyre 1, in particular in order to measure the deformation and wear thereof.

The assembly also comprises a coder 5 rotationally fixed to the tyre 1 and a sensor 6 fixed to the chassis 2 of the vehicle. In particular, the coder 5 and/or the sensor 6 can be disposed at the wheel bearing, as described for example in the document FR-2 700 588 issuing from the applicant. The coder 5 can in particular be rotationally fixed to the rotating race of the bearing and the sensor 6 can be associated with the fixed race or dissociated from it, in order to be opposite to and at a reading distance from the coder 5.

The function of the coder 5 is to deliver reference angular position information. To this end, the coder 5 comprises a reference singularity which, as will be seen later in the description, is indexed with respect to the angular position of the transponder 3 on the tyre 1.

The assembly also comprises a device for measuring the speed of rotation of the tyre 1. A description is given below of an embodiment in which the device for measuring the speed is integrated in the sensor 6. However, other embodiments comprising a separate speed measuring device can also be envisaged.

According to the embodiment, the coder 5 is formed from a magnetic ring comprising on its surface a main track and a rotation pulse track which are concentric, the said tracks comprising a succession of North and South poles, the reference singularity being produced by a magnetic transition which is different from the others.

Opposite to and at a reading distance from this coder 5 there is provided the sensor 6 which comprises an electronic circuit which also forms the device for measuring the speed of rotation of the tyre 1. To this end, the electronic circuit is able to deliver a signal representing the speed of rotation of the coder 5, and therefore that of the tyre 1 since the coder is rotationally fixed to the latter, with respect to the chassis 2 and a rotation pulse signal comprising a reference pulse corresponding to the detection of the reference singularity.

According to one embodiment, the sensor 6 comprises at least three sensitive elements, at least two of which are positioned opposite the main track and at least one of which is positioned opposite the rotation pulse track.

In a particular example, the sensitive elements are chosen from the group comprising Hall effect sensors, magnetoresistors and giant magnetoresistors.

The sensor 6 used in this embodiment is able to deliver two periodic electrical signals S1, S2 in quadrature by means of the sensitive elements disposed opposite the main track and an electrical signal S3 by means of the sensitive elements disposed opposite the rotation pulse track.

The principle of obtaining the signals S1 and S2 from a plurality of aligned sensitive elements is for example described in the document FR-2 792 403 issuing from the applicant.

However, sensors comprising two sensitive elements which are able to deliver the signals S1 and S2 are also known.

From the signals S1, S2 and S3, the electronic circuit is able to deliver square digital signals A, B in quadrature and a rotation pulse signal C. The signals A, B representing the speed of rotation of the coder but also its angular position as well as its direction of rotation.

A principle of obtaining the digital signals A, B and C, as well as various embodiments of the magnetic singularities, are described in the documents FR-2 769 088 and EP-0 871 014.

According to one embodiment, the electronic circuit also comprises an interpolator, for example of the type described in the document FR-2 754 063 issuing from the applicant, making it possible to increase the resolution of the output signals.

The sensor 6 can be integrated on a silicon substrate or equivalent, for example AsGa, so as to form an integrated circuit personalised for a specific application, a circuit sometimes termed an ASIC in order to refer to the integrated circuit designed partially or completely according to requirements.

Although the description is given in relation to a magnetic sensor/coder assembly, it is also possible to implement the invention in a similar fashion using a technology of the optical type. For example, the coder 5 can be formed from a metal or glass target on which the main track and rotation pulse track have been etched so as to form an optical pattern similar to the multipole magnetic pattern disclosed above, the sensitive elements then being formed from optical detectors.

In addition to the assembly or assemblies, the system comprises an activation device 7, in the form of a calculation unit, which is connected to each sensor 6, to each detection device 4 and to each speed measuring device, so as to be able to synchronise in time the passage of the transponder 3 into the transmission/reception cone of the antenna of the said detection device in order to collect the value of the parameter or parameters detected. According to the invention, the activation device 7 is able, when a reference pulse issuing from the sensor 6 of an assembly is recorded, to activate the detection device 4 of the assembly at a moment which is a function of the indexed position of the transponder 3 and of the speed measured, so that the transponder 3 of the assembly is in the transmission/reception cone of the antenna of the said detection device.

This is because, the position of the singularity being indexed with respect to that of the transponder 3, there exists, between the reference pulse and the position of the transponder 3, a difference in time which is a function of the speed. The angular range of the transmission/reception cone of the antenna being known, this difference is used by the activation device 7 in order to determine an activation time in which the transponder 3 is in the said cone. In particular, the system according to the invention makes it possible, by virtue of the synchronisation, to optimise the life of the battery supplying the activation device 7 and, where applicable, of the battery supplying the transponder 3 in the case where the latter is active.

According to one embodiment, each coder 5 comprises means of coding the pulse which are different from one coder 5 to another, the activation device 7 comprising means of identifying the coding so as to activate the detection device 4 of the assembly of the coder 5 from which the pulse came. This embodiment may make it possible to simplify the wiring between the assemblies and the activation device 7, since the recognition of the tyre 1 concerned no longer depends on the physical addressing of the position signals to the activation device 7. In particular, according to this embodiment, it is possible to provide a multiplexed or wireless connection between the assemblies and the activation device 7. Moreover, this embodiment makes it possible to electronically identify the wheel from which the parameter or parameters came.

In one example embodiment, the coding means comprise a number of supplementary singularities which are distributed on the coder 5.

In a determination method using a system according to the invention, when a reference pulse is recorded, the activation device 7 determines an activation time as a function of the measured speed and of the indexed position of the transponder 3, the activation device 7 activating the detection device 4 after the elapse of this time.

According to one embodiment, the method provides for a procedure for recalculating the time according to the variations in speed occurring before activation. This procedure makes it possible, in the case of acceleration and/or deceleration of the vehicle between the determination of the time and the activation, to take account of the change in speed in order to synchronise the passage of the transponder 3 into the transmission/reception cone.

According to one embodiment, provision can be made to effect the activation at variable interrogation periods which are determined according to the operating conditions of the tyre 1. In particular, these conditions may be a function of the parameter or parameters measured (pressure, temperature), the running conditions of the vehicle such as the speed or state of the road (rain or snow condition for example) or the positioning of the tyre 1 (front or rear). To do this, the activation device 7 is also supplied with the pertinent parameters and with the required conditions for calculating the activation time according to the said operating conditions.

In one example embodiment, it is possible to define at least one speed threshold for the vehicle so that:
below the threshold, the activation time is determined so as to effect the activation at a frequency $f_i$;
above the threshold, the activation time is determined so as to effect the activation at a frequency which is a multiple of $f_i$.

It can also be decided to determine the pressure of the rear tyres 1 more frequently than that of the front tyres.

A description is given below of possible embodiments of the indexing of the transponder 3 with respect to the reference singularity.

According to a first embodiment, the indexed position of the transponder 3 with respect to the reference singularity is previously stored in the activation device 7. For example, this indexing is achieved mechanically in the factory or in a workshop, on a bench able to measure the angular difference between the reference singularity and the transponder 3.

According to a variant of this embodiment, the reference singularity is indexed with respect to all the possible angular positions of the transponder 3 on the tyre 1, these positions each corresponding to a possible position of mounting of the wheel on the vehicle.

In this embodiment, the activation device 7 is able to activate the detection device 4 when each possible angular position of the transponder 3 is in the transmission/reception cone of the antenna. Thus, for example for four possible positions, the detection device 4 will be activated four times, the communication being achieved in a satisfactory fashion solely in one of these positions.

This embodiment makes it possible, in the case of mounting/removal of the wheel, not to have to redo the indexing.

According to a second embodiment, the determination method comprises a prior procedure of indexing the position of the reference singularity with respect to the angular position of the transponder 3.

This procedure can be carried out by activation at fixed frequency, for example every second, of the detection device 4 and, when the signal measured by the detection device 4 is satisfactory, determination and recording in the activation device 7 of the position indexed when the following reference pulse is detected.

In particular, this procedure can be triggered each time the determination system is brought into service, before the determination of the parameter or parameters according to the invention.

According to one embodiment, it is possible to provide an iterative procedure of optimising the indexed position, the said procedure being able to be triggered continuously or periodically.

The optimisation procedure can make provision for analysing the quality of the signal issuing from the detection device 4, for example its signal to noise ratio, the communication error rate or the power communicated. If this quality is below a first threshold, incrementing and/or decrementing the indexed position by a given step, for example one degree. Iteratively, the procedure makes it possible, by analysing the quality of the corresponding signal, to increment or decrement the indexed position in order to obtain an optimised indexed position in which the quality of the signal is at a maximum. This optimised position is used subsequently as a new indexed position in the activation device 7.

According to one embodiment of the method, a second signal quality threshold, lower than the first, is used in the activation device 7. It is thus possible to make provision, if the quality of the signal is below the second threshold, to trigger the indexing procedure in place of the optimisation procedure. In particular, this embodiment makes it possible, if the optimisation procedure does not make it possible to converge towards an optimised position, to initiate an indexing procedure in the course of optimisation.

The invention claimed is:

1. A system for determining at least one parameter of at least one member (1) rotating with respect to a fixed structure (2), said system comprising, for each rotating member (1), an assembly comprising:
   a transponder (3) rotationally fixed to the rotating member (1), the transponder being able to measure the parameter or parameters to be determined;
   a coder (5) rotationally fixed to the rotating member (1), the coder comprising a reference singularity whose angular position is indexed with respect to the angular position of the transponder (3) on the rotating member (1);
   a sensor (6) fixed to the fixed structure (2), the sensor being disposed opposite to and at a reading distance from the coder (5), the sensor being able to deliver a rotation pulse signal comprising a reference pulse corresponding to the detection of the reference singularity;
   a detection device (4) for detecting the parameter or parameters issuing from the transponder (3), the device being fixed to the fixed structure (2) and comprising a communication means able to send an excitation signal to the transponder (3) and to receive the measurement or measurements, said communication means having a transmission/reception cone;
   a device for measuring the speed of rotation of the rotating member (1);
said system also comprising:
   an activation device (7) which is connected to each sensor (6), to each detection device (4) and to each speed measurement device, the activation device being able, when a reference pulse issuing from the sensor (6) of an assembly is recorded, to activate the assembly detection device (4) at a moment which is a function of the indexed position of the transponder (3) and of the measured speed, so that the transponder (3) of the assembly is in the transmission/reception cone of the communication means of the detection device.

2. A system according claim 1, characterised in that the coder (5) comprises a main multipole track and a rotation pulse multipole track which are concentric, the rotation pulse track comprising the reference singularity, the sensor (6) comprising an electronic circuit delivering the rotation pulse signal and forming a device for measuring the speed of rotation.

3. A system according to claim 2, characterised in that the coder (5) is formed from a magnetic ring comprising on its surface the main track and the rotation pulse track which are concentric, the tracks comprising a succession of North and South poles, the reference singularity being produced by a magnetic transition which is different from the others.

4. A system according to any one of claims 1 to 3, characterised in that the reference singularity is indexed with respect to all the possible angular positions of the transponder (3) on the rotating member (1), the activation device (7) being able, when the reference pulse is recorded, to activate the detection device (4) when each possible angular position of the transponder is in the transmission/reception cone of the communication means.

5. A system according to any one of claims 1 to 3, characterised in that each coder (5) also comprises pulse coding means which are different from one coder (5) to another, the activation device (7) comprising means for identifying the coding so as to activate the detection device (4) corresponding to the assembly of the coder (5) from which the pulse came.

6. A system according to claim 5, characterised in that the coding means comprise a number of supplementary singularities which are distributed on the coder.

7. A method of determining at least one parameter of at least one member (1) rotating with respect to a fixed structure (2) by a system according to claim 1, in which, when a reference pulse is recorded, the activation device (7) determines an activation time as a function of the measured speed and the indexed position of the transponder (3), the device activating the detection device (4) after the elapse of this time.

8. A method according to claim 7, characterised in that it comprises a procedure of recalculating the time according to the variations in speed occurring before the activation.

9. A method according to claim 8, characterised in that the indexed position of the transponder (3) with respect to the reference singularity is previously stored in the activation device (7).

10. A method according to claim 8, characterised in that it comprises a prior procedure of indexing the position of the reference singularity with respect to the angular position of the transponder (3) on the rotating member (1).

11. A method according to claim 10, characterised in that the indexing procedure is effected by activating the detection device (4) at fixed frequency and, when the signal measured by the device is satisfactory, determination of the position indexed when the following reference pulse is detected.

12. A method according to claim 7, characterised in that the indexed position of the transponder (3) with respect to the reference singularity is previously stored in the activation device (7).

13. A method according to claim 7, characterised in that it comprises a prior procedure of indexing the position of the reference singularity with respect to the angular position of the transponder (3) on the rotating member (1).

14. A method according to claim 13, characterised in that the indexing procedure is effected by activating the detection device (4) at fixed frequency and, when the signal measured by the device is satisfactory, determination of the position indexed when the following reference pulse is detected.

15. A method according to any one of claims, 7, 8, 12, 13, 14, 9, 10, or 11, characterized in that it comprise an iterative procedure of optimising the indexed position in which the quality of the signal issuing from the detection device (4) is analyzed, and, if the quality is below a threshold, the indexed position is incremented and/or decremented by a given step in order to determine a new optimised indexed position which is used subsequently by the activation device (7).

16. A method according to claim 13, characterised in that it comprises an iterative procedure of optimising the indexed position in which the quality of the signal issuing from the detection device (4) is analysed, and, if the quality is below a threshold, the indexed position is incremented and/or decremented by a given step in order to determine a new optimised indexed position which is used subsequently by the activation device (7) in which, if the quality of the signal is below a second threshold which is below the first threshold, the indexing procedure is carried out in place of the optimisation procedure.

17. A method according to claim 7, characterised in that the activation time is also a function of the operating conditions of the rotating member (1).

18. A motor vehicle comprising a system according to any one of claims 1 to 3, each assembly being disposed so as to determine at least one parameter of a tyre (1) of the said vehicle.

19. A vehicle according to claim 18, characterised in that the communication means is housed in the arch of the wheel on which the tyre (1) is mounted and in that the transponder (3) is housed in the valve of the tyre (1).

20. A motor vehicle comprising a system to claim 4, each assembly being disposed so as to determine at least one parameter of a tyre (1) of the said vehicle.

21. A vehicle according to claim 20, characterised in that the communication means is housed in the arch of the wheel on which the tyre (1) is mounted and in that the transponder (3) is housed in the valve of the tyre (1).

22. A motor vehicle comprising a system to claim 5, each assembly being disposed so as to determine at least one parameter of a tyre (1) of the said vehicle.

23. A vehicle according to claim 22, characterised in that the communication means is housed in the arch of the wheel on which the tyre (1) is mounted and in that the transponder (3) is housed in the valve of the tyre (1).

24. A motor vehicle comprising a system to claim 6, each assembly being disposed so as to determine at least one parameter of a tyre (1) of the said vehicle.

25. A vehicle according to claim 24, characterised in that the communication means is housed in the arch of the wheel on which the tyre (1) is mounted and in that the transponder (3) is housed in the valve of the tyre (1).

* * * * *